(12) United States Patent
Ingraffia

(10) Patent No.: US 12,012,806 B1
(45) Date of Patent: Jun. 18, 2024

(54) ELEVATED WORK PLATFORM FOR USE WITH A LADDER

(71) Applicant: Chris Ingraffia, Chicago, IL (US)

(72) Inventor: Chris Ingraffia, Chicago, IL (US)

( * ) Notice: Subject to any disclaimer, the term of this patent is extended or adjusted under 35 U.S.C. 154(b) by 0 days.

(21) Appl. No.: 18/070,165

(22) Filed: Nov. 28, 2022

(51) Int. Cl.
  *E06C 7/14* (2006.01)
  *F16M 11/28* (2006.01)
  *F16M 11/42* (2006.01)

(52) U.S. Cl.
  CPC .............. *E06C 7/14* (2013.01); *F16M 11/28* (2013.01); *F16M 11/42* (2013.01)

(58) Field of Classification Search
  CPC ........... E06C 7/14; F16M 11/28; F16M 11/42
  USPC ....... 248/125.8, 210, 218.4, 195.11, 297.31, 248/297.51, 507; 182/169
  See application file for complete search history.

(56) References Cited

U.S. PATENT DOCUMENTS

| | | | | |
|---|---|---|---|---|
| 2,553,890 A * | 5/1951 | Bloch | ................... | F16M 11/42 248/188.7 |
| 7,216,742 B2 * | 5/2007 | Spengler | ................. | E06C 7/423 182/172 |
| 8,424,642 B2 * | 4/2013 | Lietz | ........................ | E06C 1/06 182/172 |
| 10,663,839 B1 * | 5/2020 | O'Brien | ................. | F16M 11/16 |
| 2007/0080268 A1 * | 4/2007 | Worrell | .................... | E04F 21/06 248/177.1 |
| 2015/0218884 A1 * | 8/2015 | Kempthorne | ............ | E06C 7/00 182/107 |
| 2021/0123302 A1 * | 4/2021 | Caldwell | ................... | E06C 7/50 |
| 2022/0349516 A1 * | 11/2022 | Liao | ....................... | F16M 11/10 |
| 2023/0184034 A1 * | 6/2023 | Vargas | .................... | E06C 1/397 182/107 |

* cited by examiner

*Primary Examiner* — Anita M King
(74) *Attorney, Agent, or Firm* — James D Palmatier; Applied Patent Services

(57) ABSTRACT

The elevated work platform for use with a ladder comprises a tripod base having an adjustable vertical support, a brace and a trolley. The trolley comprising wheels and a tongue on the tripod base. The tripod base further comprising three legs wherein one leg may be disposed between the front and back legs of a step ladder and another of the three legs adjacent to the front legs of the ladder with the third leg adjacent to the back leg of the ladder. The vertical support comprises a multi-piece pole having an adjustable coupling at each junction for adjusting the height of the platform. The brace is attached between the front and back legs of the ladder to hold the work platform in spaced relation to the ladder. The legs may fold up to a generally parallel orientation to the vertical support for transport by wheels like a two wheel dolly or storage.

9 Claims, 2 Drawing Sheets

ELEVATED WORK PLATFORM FOR USE WITH A LADDER

FIELD OF THE INVENTION

The present invention relates generally to an elevated work platform for use with a step ladder.

DESCRIPTION OF RELATED ART

Working on ladders, including stepladders, can be difficult because it often means the user doesn't have ready or convenient access to tools and materials generally placed on the ground below the ladder. It is even more inconvenient, and dangerous, when users attempt to use various tools and material while on the ladder. Namely, users must balance themselves on the ladder while attempting to hold, manipulate, or otherwise use the items.

While stepladders have a top platform, it does not provide much assistance with holding tools and material. The top platform is small and easily disturbed as the user works near the top of the ladder. Various devices have been designed to hold materials and tools while the user is on the ladder. These devices such as trays or bucket hangers may obstruct the path up the ladder and clutter the area around the user making it dangerous for the user and anyone below. Some devices may upset the balance of the ladder by weighing down one side causing the ladder the be tipsy.

These prior art devices have failed to properly and efficiently address the problems with working on stepladder. As such, there exists a need for a system and device that can act as a platform that selectively moves with the ladder and adds strength and stability to the ladder for improved utility and safety.

There is a need for a device to support materials and tools adjacent to a ladder that does not depend on the ladder for support. The device should be useful in moving the ladder and should not impede the user from traversing the ladder or working from on the ladder. Therefore, it is desirable to provide a work support for use on a ladder that has a stable, wheeled base independent from the ladder.

BRIEF DESCRIPTION OF THE PRESENT INVENTION

The present invention is an elevated work platform for use with a ladder a tripod base, an adjustable vertical support and a user platform adjustable positioned along side the ladder. The tripod base having a first leg disposed under the ladder, between the front legs and the back legs of a step ladder, a second and third legs disposed adjacent to the front and back legs respectively. A trolley comprising a foot rest, and a pair of wheels is connected to the tripod base by a strut extending generally horizontal from the vertical support section. The vertical support may have a first end on the tripod base and a second end adjustably disposed adjacent to the ladder. A work platform may be disposed on the second end for supporting a bucket, tools or work materials. A pair of support arms extend from the vertical support may engage the ladder to hold the vertical support in spaced relation to the ladder. A plurality of adjustable couplings on the vertical support site may be adapted to change the length of the vertical support whereby the work platform may be spaced from the tripod base at a predetermined distance.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE PREFERRED EMBODIMENT

Figure 1:
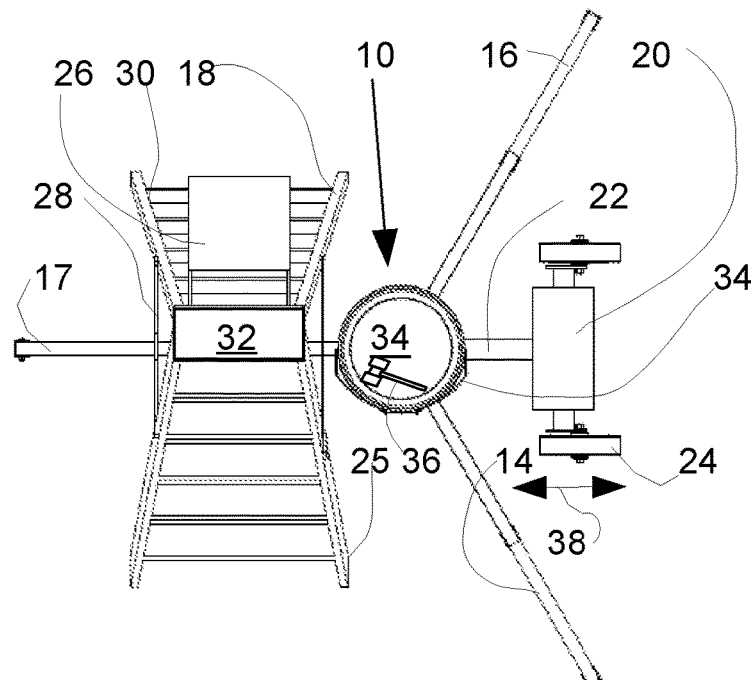
FIG. 1 is a top plan view of the elevated work platform for use with a step ladder configured in accordance with the present invention

Referring now to the drawings, FIG. 1 is a top view of a elevated work platform 10 for use on a ladder 18. The elevated work platform 10 may comprise a plurality of legs 14, 16, 17 and a trolley 20. The trolley 20 may comprise a tongue 22 attached to the elevated work platform 10 and a plurality of wheels 24 adapted to roll in a direction 38 generally parallel to tongue 22. The ladder 18 may comprise a pair of back legs 25, a front leg 30, a ladder shelf 26, a strut 28 and a ladder top 32. A bucket 34 may be supported on the elevated work platform 10 adjacent to the ladder top 32 for holding tools and materials 36.

Figure 2:
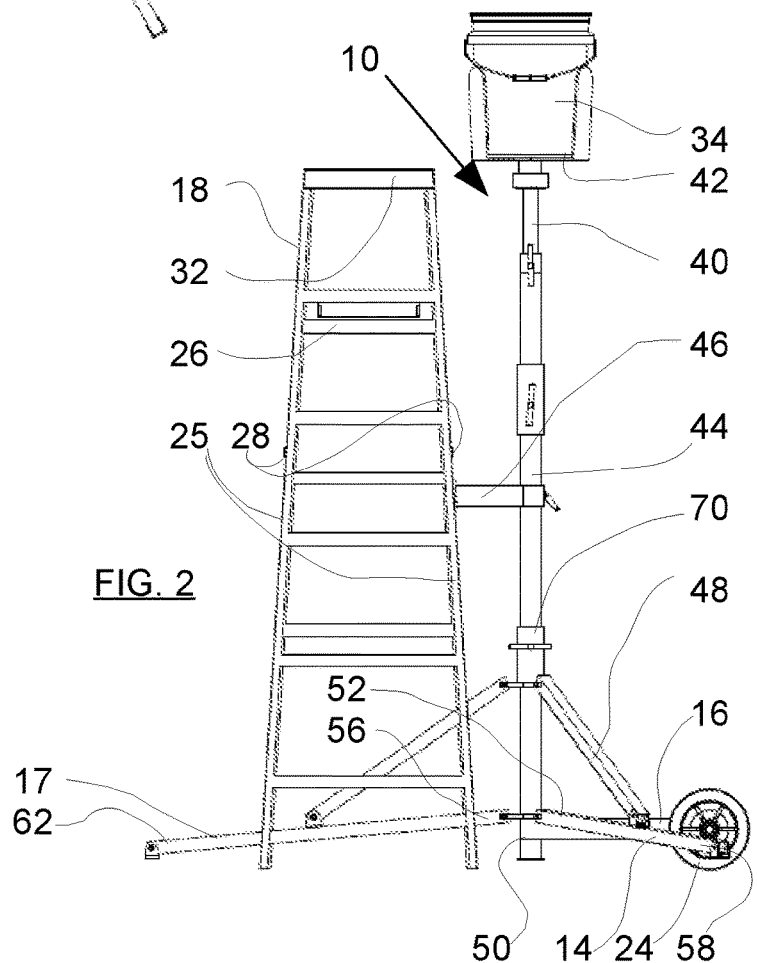
FIG. 2 is a front view thereof.

Referring to FIG. 2, the elevated work platform 10 may further comprise a vertical support 40 and a platform 42. The vertical support 40 may comprise a pole 44, a brace 46 and a tripod base 50. Legs 14 16, 17 each may comprise a tripod end 52, 56 and a distal end 58, 62 respectively. Tripod ends 52, 56 are attached to tripod base 50. Distal ends 58, 62 are disposed in spaced relation to the tripod base 50. A plurality of links 48 may be disposed on vertical support 40 and attached to legs 14, 16 and 17. Links 48 may be disposed on tripod coupling 70. Brace 46 may be attached to pole 44 and back ladder leg 25 to hold platform 42 having a flat surface, in a predetermined spacing from ladder 18.

Figure 3:
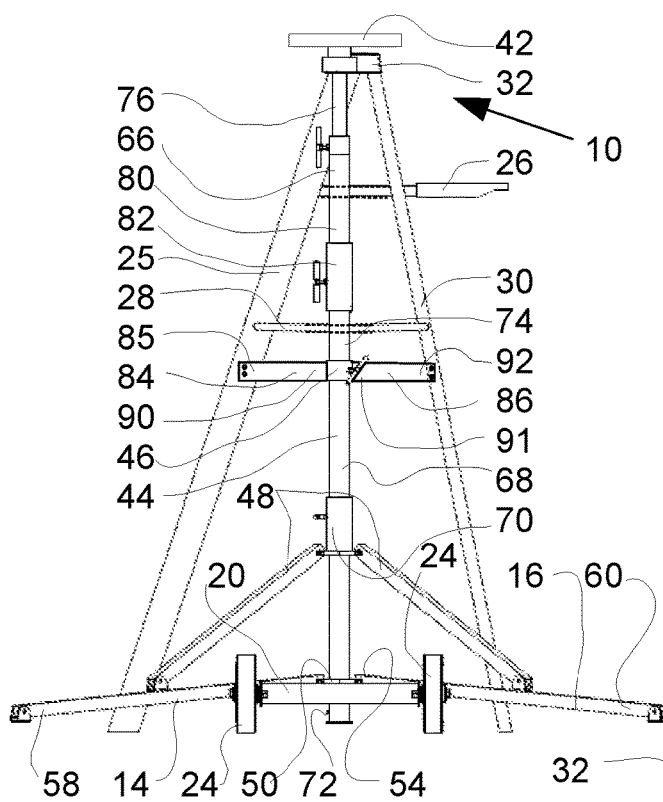
FIG. 3. is a side view thereof.

Referring to FIG. 3, the tripod base 50 may have first leg 14 adjacent to back legs 25, second leg 16 comprising tripod end 54 on tripod base 50 and second distal end 60 disposed adjacent to front leg 30. Wheels 24 are on opposing ends of trolley 20 and adapted to roll. Tripod coupling 70 may be adjustably disposed on pole 44 and braces 48 to legs 14, 16. Tripod coupling 70 may be moved to a position adjacent to brace 46 thus pivoting legs 14, 16 and 17 about the tripod base to an orientation generally parallel to pole 44 for transport and storage. Pole 44 may comprise a top section 66, a bottom section 68 and an extension coupling 82. The bottom section 68 having a first bottom end 72 and a second bottom end 74. The first bottom end 72 on the tripod base 50. The top section 66 having a first top end 76 and second top end 80. The first top end 76 on the platform 42. Second top end 80 adjustably attached to an extension coupling 82. Second bottom end 74 on extension coupling 82. Extension coupling 82 may be threadably attached to top section 66 and bottom section 68 whereby the platform 42 traverses vertically to a predetermined height adjacent to the ladder 18 upon rotation of the top section 66 with respect to extension coupling 82. The bottom section 68 on the tripod base and a top section 66 on the platform 42.

Continuing to refer to FIG. 3, brace 46 may have a first arm 84 and second arm 86. First arm 84 may have first pole end 90 on brace coupling 86 and first leg end 85 on ladder 18. Second arm 86 may have second pole 91 end on brace coupling 86 and second leg end 92 on ladder 18 whereby brace 46 attaches vertical support 40 to front leg 30 and back leg 25. It should be understood, the work platform 10 may be folded up having the tripod coupling 70 slid up the pole 44 to a position adjacent the brace 46 whereby links 48 urge legs 14, 16 and 17 to pivot about the tripod base 50 to a generally parallel orientation to pole 40. Foot rest 21 may be used to balance work platform 10 on wheels 24 for wheeling work platform 10 about like a 2-wheel dolly.

Figure 4:
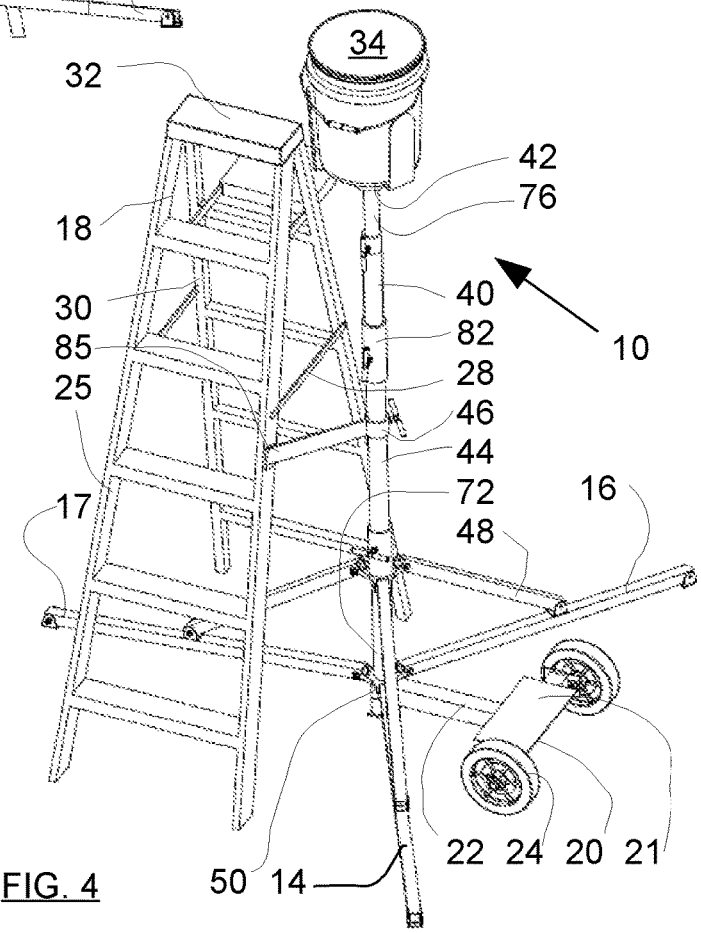
FIG. 4 is a top perspective view thereof.

Referring to FIG. 4, tripod base 50, vertical support 40 and a platform 42 may be adjustably positioned alongside the ladder 18. The tripod base 50 having a first leg 17 disposed under the ladder 18 between the front leg 30 and the back legs 25. The second 14 and third leg 16 may be disposed adjacent to the front 30 and back 25 legs respectively. The trolley 20 comprising a foot rest 21, and a pair of wheels 24 is connected to the tripod base 50 by tongue 22 extending generally horizontally from the tripod base 50. The vertical support 40 may have a first end 72 on the tripod base and a second end 76 adjustably disposed adjacent to the ladder 18. The platform 42 may be disposed on the second end 76. A pair of support arms 84, 86 extend from the vertical support 40 to engage the ladder 18 to hold the vertical support 40 in spaced relation to the ladder 18. A plurality of adjustable couplings 82 on the vertical support 40 may be adapted to change the length of the vertical support 40 whereby the work platform 42 may be vertically adjusted to a predetermined height with respect to the tripod base 50

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A work platform for use on a ladder, the ladder comprising a pair of back legs, a front leg and a ladder top, the work platform comprising:

a tripod base having a first leg, a second leg, and a third leg;

a platform;

a vertical support, the vertical support comprising a first end on the tripod base and a second end on the platform; and a brace, the brace on the vertical support, the brace comprising a first brace end and a second brace end, wherein the brace further comprises a first arm on the ladder front leg and a second arm on one of the pair of back legs.

2. The work platform of claim 1, further comprising a trolley on the tripod base, the trolley comprising a pair of wheels.

3. The work platform of claim 2, further comprising a foot rest on the trolley.

4. The work platform of claim 1, further comprising an extension coupling on the vertical support and the vertical support comprising a length whereby the vertical support length may be adjusted to a predetermined length.

5. A work platform for use on a ladder, the ladder comprising a pair of back legs, a front leg and a ladder top, the work platform comprising:

a tripod base having tripod coupling, a first leg, a second leg, and a third leg, each of the first, second and third legs comprising a link on the tripod coupling, the first leg adapted to be disposed between the pair of back legs and the front leg, the second leg disposed adjacent to the front leg, the third tripod leg disposed adjacent to the pair of back legs;

a vertical support, the vertical support comprising a first end on the tripod base and a second end disposed in spaced relation to the ladder top;

a platform, the platform on the vertical support; and a brace, the brace on the vertical support, the brace comprising a first brace end adapted to attach to the ladder front leg and a second brace end adapted to attach to one of the ladder back legs.

6. The work platform of claim 5, further comprising a trolley on the tripod base, the trolley comprising a foot rest and a plurality of wheels.

7. The work platform of claim 6, further comprising a tripod coupling on the vertical support, the tripod coupling attached to each of the first, second and third legs.

8. The work platform of claim 7, further comprising a link on the tripod coupling, the link attached to the first leg.

9. The work platform of claim 6, further comprising a tongue on the tripod base, the tongue on the trolley whereby the trolley is in spaced relation to the tripod base.

* * * * *